UNITED STATES PATENT OFFICE.

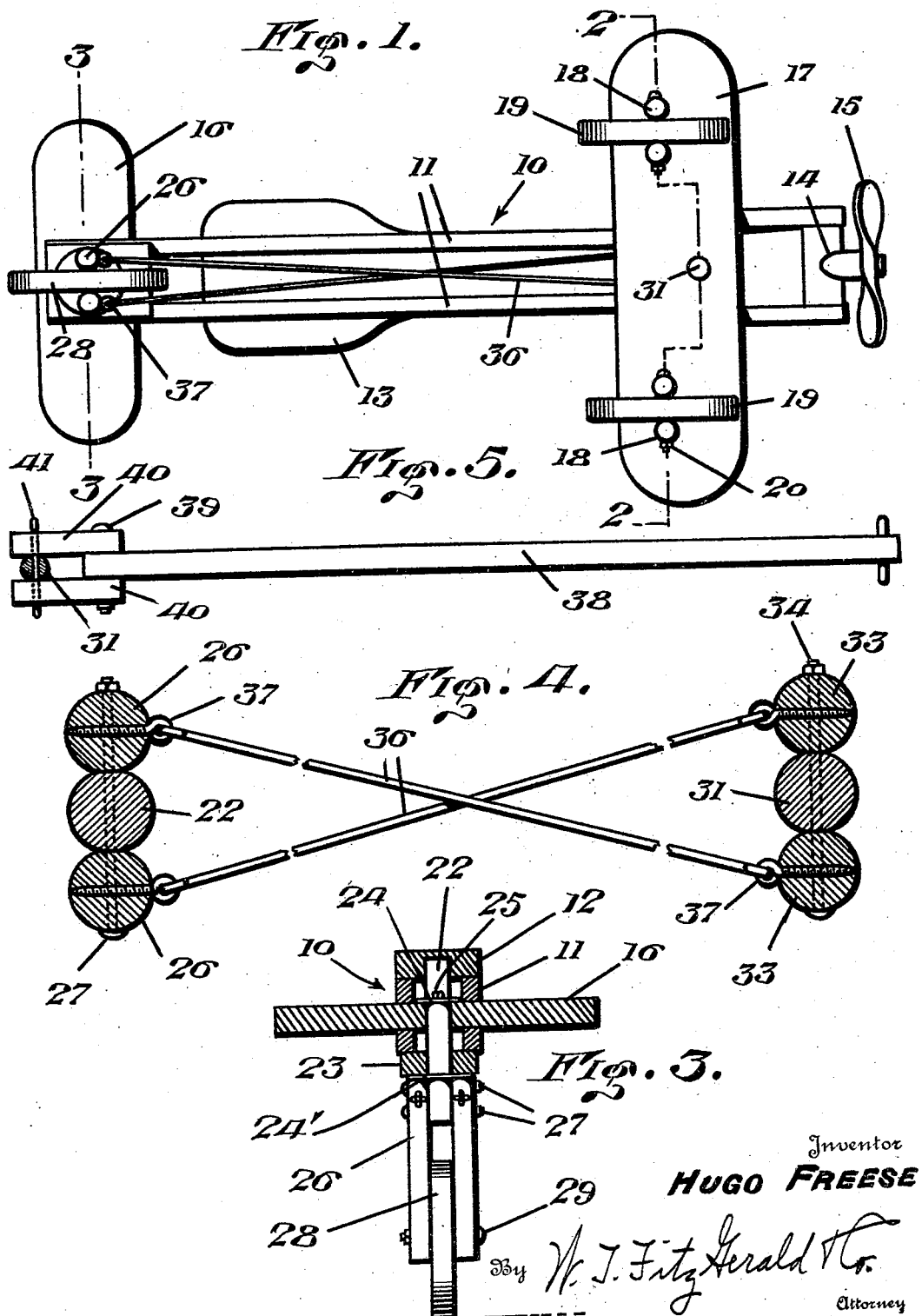

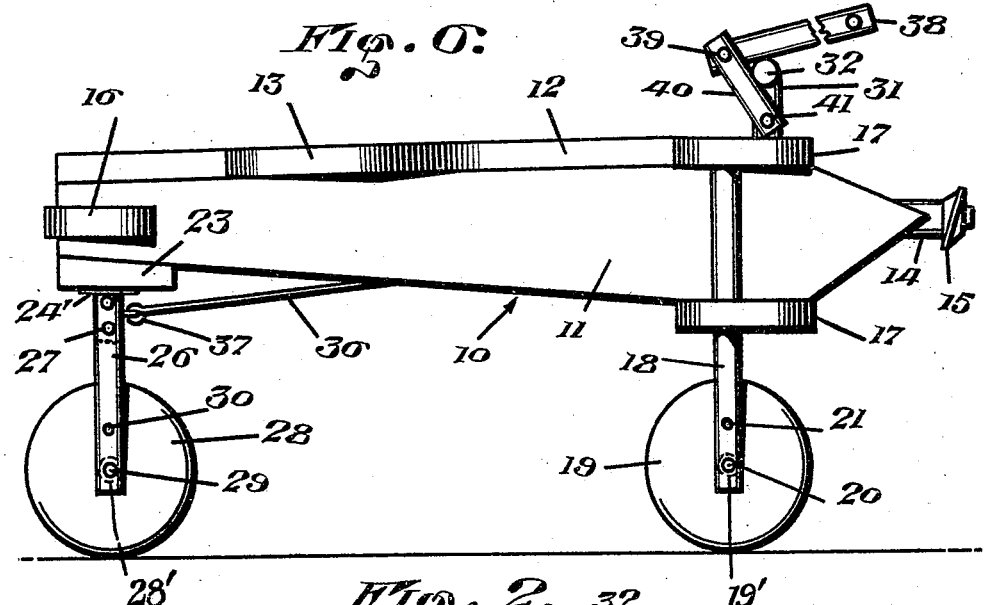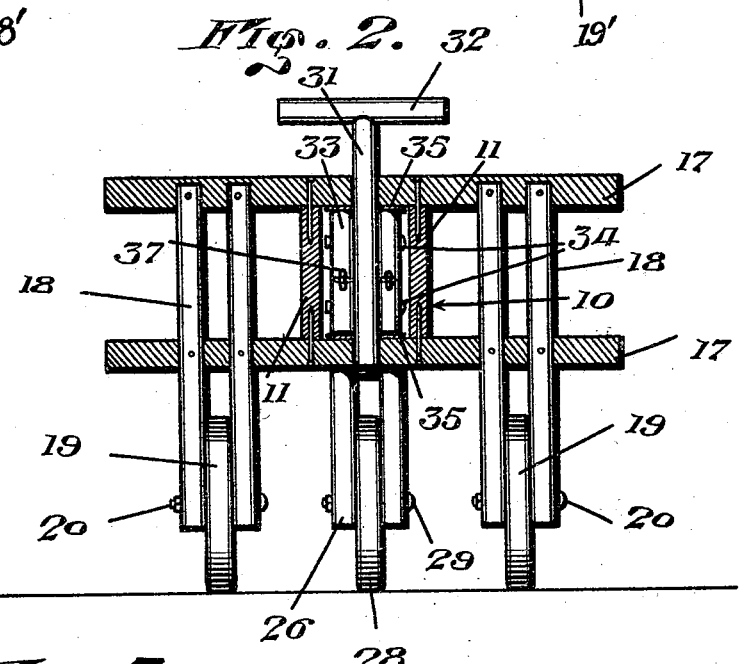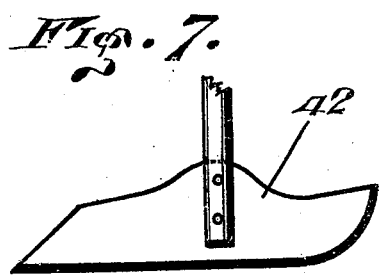

HUGO FREESE, OF GENESEO, NEW YORK.

VEHICLE RUNNING AND STEERING GEAR.

1,413,464.

Specification of Letters Patent.  Patented Apr. 18, 1922.

Application filed April 20, 1920. Serial No. 375,301.

*To all whom it may concern:*

Be it known that I, HUGO FREESE, a citizen of the United States, residing at Geneseo, in the county of Livingston and State of New York, have invented certain new and useful Improvements in Vehicle Running and Steering Gears; and I do hereby declare the following to be a full, clear, and exact description of the invention, such as will enable others skilled in the art to which it appertains to make and use the same.

The present invention relates to vehicles, and one of the objects of the invention is the provision of a novel and improved steering gear including a novel connection between the steering wheel or member, and the steering post.

Another object is the provision of a novel standard or fork for the steering wheel, and composed of pieces of wood having means for connection with the steering post.

A further object is the provision of a steering post also composed of pieces of wood for mounting it in the frame or body of the vehicle, and having means for connection with the steering wheel standard or fork.

Another object is the provision of novel means for mounting the frame or body on the wheels (or runners), especially for use in a child's push car or the like.

A still further object is the provision of a novel connection between a pull or push handle and the steering post, to enable the car or vehicle to be pulled or pushed from the handle.

The invention also has for its object the construction of a child's push car or vehicle composed and constructed of wood in a simple and inexpensive manner, which will be strong and durable in construction, and efficient in use.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a bottom plan view of the vehicle.

Figs. 2 and 3 are cross sections taken on the respective lines 2—2 and 3—3 of Fig. 1.

Fig. 4 is an enlarged sectional view taken through the steering wheel fork or standard and steering post along the connecting rods or links, portions being broken away.

Fig. 5 is a plan view of the handle for pushing and pulling the vehicle.

Fig. 6 is a side elevation of the vehicle, a portion of the handle being broken away.

Fig. 7 is a detail view showing the use of a runner instead of a wheel.

The improvements are shown as embodied in a push car or vehicle for children, although the improvements can be used in larger vehicles, airplane landing gear and the like. The vehicle or car has a longitudinal body or frame 10 composed of longitudinal side pieces 11, on the upper edges of which a top piece 12 is secured, being provided with a seat 13. This enables the child to ride astride the vehicle. The vehicle is constructed to resemble an airplane, having a nose piece 14 on which a propeller 15 is mounted for rotation, to resemble the propeller of an airplane. A horizontal transverse plate 16 is mortised in the rear ends of the side pieces 11 to represent the horizontal rudder of an airplane, and horizontal transverse plates 17 are secured to the upper and lower edges of the side pieces 11 near their forward ends to resemble the wings or planes of an airplane. The foregoing parts are readily made from wood, and constitute the frame of the vehicle.

The running gear of the vehicle includes two front wheels and a rear steering wheel. In order to accommodate the front wheels, two pairs of vertical posts or standards 18 extend through holes in the lower plate 17 and have their upper ends fitted and seated within recesses in the upper plate 17, as seen in Fig. 2, and said posts are secured to said plates, thereby providing a rigid structure. The front wheels 19 are disposed between the lower terminals of the posts 18 and are mounted on axles 20. The posts 18 have vertically spaced apertures 21 for the reception of axles 20, whereby the vehicle frame or body can be adjusted vertically to accommodate the child. In this way, adjustments can be made to raise or lower the frame and seat 13, to suit smaller and larger children. The wheels 19 can be cut from wood, and posts 18 are readily cut from wooden stock of circular cross section.

The rear wheel 28, which is preferably of wood, also forms a part of the steering gear, and carries a standard or post supporting the rear end of the body. This post or fork comprises a vertical shank 22 extending through an aperture in a block 23 secured to the lower edges of the side pieces 11 at the rear end thereof, and said shank is also journaled to an aperture in the plate 16 and is seated and fitted within a recess in the top piece 12, as seen in Fig. 3. A bearing for the shank 22 is thus provided, and a washer 24 is fitted on said shank and seats on the plate 16, and a cotter pin 25 engages through the shank and rests on the washer 24, thereby supporting said shank in the frame, when the frame is raised from the ground. Two pieces 26 have their upper terminals overlapping the lower projecting terminal of the shank 22 and are disposed vertically and parallel with one another and with the shank, and the overlapping terminals of said shank and pieces are secured rigidly together by means of clamping bolts 27 or the like extending therethrough. The shank and pieces thus provide a fork, the pieces or arms 26 of which straddle the rear steering wheel 28, and a washer 24 is fittted on the shank 22 and seats on the upper ends of the pieces or arms 26, and supports the bearing block 23. The wheel 28 is mounted on an axle 29 which is also adjustable vertically in apertures 30 in the pieces or arms 26, for raising and lowering the rear end of the frame to suit the child.

Each of the wheels is thus mounted for rotation between a pair of vertical posts or pieces, which have vertically spaced apertures for the reception of the axles for raising and lowering the vehicle. The shank 22 and pieces 26 of the steering wheel 28 are also readily cut from stock of circular cross section, the same as the posts 18. Turning the fork of the rear steering wheel, will bring the steering wheel to different angles for steering the vehicle as will be readily understood, and the steering gear can be used on larger vehicles and also on airplanes, to advantage.

The steering fork or standard is controlled from a steering posts 31 which is journaled in a vertical position within apertures in the plates 17 between the side pieces 11, and the steering post 31 has a handle bar 32 at its upper end so that the child can turn the steering post conveniently. Two pieces 33 are disposed at opposite sides of the post 31 between the plates 17, and said post and pieces are secured together by means of bolts 34 or the like extending therethrough. Said post 31 and pieces 33 are of similar stock as the posts 18 and parts of the steering wheel fork. The pieces 33 being disposed between the plates 17 will hold the steering post in position against vertical movement in the frame, and washers 35 are preferably fitted on the post 31 against the ends of the pieces 33 and bearing against the plates 17 to enable the steering post to turn easily.

The steering wheel fork and steering post are connected by rods or links 36 having their terminals loosely connected to the pieces 26 of the fork and the pieces 33 of the steering post. As shown, the terminals of the rods or links are loosely engaged in the eyes of screw eyes 37 engaged in said pieces, and the rods are crossed so that the steering wheel fork will turn in the direction opposite to the steering post, for steering the vehicle in the direction toward which the steering post is turned, according to the usual practice. The pieces 26 and 33 thus also afford means for the attachment of the connection between the fork and post, providing a simple and effective arrangement.

A handle 38 is used for pushing or pulling the vehicle, and is of suitable length. One end thereof is pivoted between a pair of link pieces 40, by means of a pivot bolt 39 extending through said handle and pieces, and the other ends of said pieces can readily straddle the steering post 31 under the handle bar 32 and above the vehicle frame, and are pivoted to said post by means of a pivot pin 41 extending through said pieces and post. Thus, the pieces 40 can extend upwardly and at an angle behind the handle bar 32, so that the handle 38 can extend forwardly over the handle bar to enable the adult or child to pull the vehicle, or the handle can also be used for pushing the vehicle if desired. By removing the pin 41, the handle 38 is readily disconnected from the steering post, when the use of the handle is not wanted. When the handle 38 is applied, and is swung, it will turn the steering post, thereby steering the vehicle the same as if it were steered by the handle bar.

In constructing the vehicle as a child's push car, it will be noted that wood is used for practically all of the parts, and the wood is flat or cut from boards for certain parts and cut from stock of circular cross section for the posts, handle and other corresponding parts, thus providing for economy and convenience in constructing the vehicle.

Runners 42 can be used instead of the wheels, as they can be readily secured between the posts or pieces, and although wheels are described and claimed, it will be understood that runners are equivalents thereof.

Having thus described the invention, what is claimed as new is:—

1. A vehicle comprising a frame, a vertical shank mounted for turning movement in the frame, and having its lower terminal projecting below the frame, a pair of parallel vertical pieces having their upper terminals overlapping the lower terminal of said shank at opposite sides, means securing said terminals together so that said shank and pieces constitute a fork, the frame resting on the upper terminals of said pieces, an axle engaging said pieces, a wheel mounted on said axle between said pieces, and means connected to said pieces under the frame for turning said shank.

2. A vehicle comprising a frame, and a steering gear including a steering post mounted for turning movement in the frame, a steering wheel fork, pieces secured to opposite sides of said post within the frame and retaining the post in place in the frame, and connections between said steering wheel and pieces.

3. A vehicle comprising a frame, a steering post mounted for turning movement in the frame, a shank mounted for turning movement in the frame for controlling a steering wheel, pieces secured to opposite sides of both said shank and post and supporting the frame, and links connecting said pieces of the post and shank.

4. A vehicle comprising a frame, a steering post mounted for turning movement therein, pieces secured to opposite sides of said steering post within the frame and retaining the post in place in the frame, a fork including a shank and a pair of pieces secured to opposite sides of the shank, said shank being mounted for turning movement in the frame and the pieces supporting the frame, a steering wheel between said pieces of the fork and having an axle engaging them, and links connecting the pieces of the post and fork.

5. A vehicle comprising a frame, a steering post mounted for turning movement therein having a transverse handle bar at its upper end, pieces pivotally connected to said post under said handle bar to extend upwardly across said handle bar at the rear thereof, and a handle having one end pivoted to and between said pieces to be swung forwardly above said handle bar.

In testimony whereof I have signed my name to this specification in the presence of two subscribing witnesses.

HUGO FREESE.

Witnesses:
AUSTIN W. ERWIN,
JESSICA M. ERWIN.